US012094643B2

(12) United States Patent
Kakizaki

(10) Patent No.: US 12,094,643 B2
(45) Date of Patent: Sep. 17, 2024

(54) COIL DEVICE

(71) Applicant: TDK CORPORATION, Tokyo (JP)

(72) Inventor: Kazuteru Kakizaki, Tsuruoka (JP)

(73) Assignee: TDK CORPORATION, Tokyo (JP)

( * ) Notice: Subject to any disclaimer, the term of this patent is extended or adjusted under 35 U.S.C. 154(b) by 414 days.

(21) Appl. No.: 17/130,331

(22) Filed: Dec. 22, 2020

(65) Prior Publication Data

US 2021/0193374 A1 Jun. 24, 2021

(30) Foreign Application Priority Data

Dec. 24, 2019 (JP) ................................. 2019-232343

(51) Int. Cl.
*H01F 27/28* (2006.01)
*H01F 27/24* (2006.01)
*H01F 27/29* (2006.01)
*H01F 27/32* (2006.01)
*H01F 41/02* (2006.01)

(52) U.S. Cl.
CPC ............. *H01F 27/32* (2013.01); *H01F 27/24* (2013.01); *H01F 27/29* (2013.01); *H01F 41/02* (2013.01)

(58) Field of Classification Search
CPC ................. H01F 27/2847; H01F 5/003; H01F 2017/0073; H01F 27/2804; H01F 2027/2814; H01F 2027/2861
See application file for complete search history.

(56) References Cited

U.S. PATENT DOCUMENTS

| | | | | |
|---|---|---|---|---|
| 6,544,365 | B2 * | 4/2003 | Tokuda | H01G 4/30 264/618 |
| 10,614,943 | B2 * | 4/2020 | Choi | H01F 41/046 |
| 10,832,857 | B2 * | 11/2020 | Lee | H01F 27/327 |
| 10,918,166 | B2 * | 2/2021 | Choi | A43C 9/00 |
| 11,094,458 | B2 * | 8/2021 | Bong | H01F 27/2804 |
| 2002/0144765 | A1 * | 10/2002 | Tatsukawa | H01F 41/043 156/89.12 |
| 2004/0164835 | A1 * | 8/2004 | Shoji | H05K 1/165 336/200 |
| 2008/0186125 | A1 * | 8/2008 | Yamamoto | H01F 17/0013 336/200 |
| 2013/0200980 | A1 * | 8/2013 | Yokoyama | H01F 27/292 336/200 |
| 2014/0306792 | A1 * | 10/2014 | Yoneda | H01F 17/0013 336/200 |
| 2017/0084380 | A1 * | 3/2017 | Lee | H01F 17/0013 |
| 2018/0374627 | A1 * | 12/2018 | Ryu | H01F 17/04 |
| 2018/0374636 | A1 * | 12/2018 | Itani | H01F 27/24 |
| 2019/0180905 | A1 * | 6/2019 | Ryu | H01F 17/04 |
| 2019/0348214 | A1 * | 11/2019 | Tobita | H01F 27/29 |
| 2020/0035413 | A1 * | 1/2020 | Hanson | H01F 41/041 |
| 2020/0294709 | A1 * | 9/2020 | Kim | H01F 17/04 |

FOREIGN PATENT DOCUMENTS

| | | | |
|---|---|---|---|
| JP | 2004-327622 | A | 11/2004 |
| JP | 2017-220572 | A | 12/2017 |
| JP | 2018-046117 | A | 3/2018 |

* cited by examiner

*Primary Examiner* — Mang Tin Bik Lian
(74) *Attorney, Agent, or Firm* — Oliff PLC

(57) ABSTRACT

A coil conductor having a multilayer part, wherein the multilayer part includes conductive plate pieces, and surfaces of the conductive plate pieces are electrically connected to each other in a laminating direction. Accordingly, an aspect ratio (cross-sectional thickness/cross-sectional width) of the cross section of the coil conductor can be close to one, and in some cases, it can be one or more.

11 Claims, 10 Drawing Sheets

COIL DEVICE

BACKGROUND OF THE INVENTION

1. Field of the Invention

The invention relates to a coil device used for such as an inductor.

2. Description of the Related Art

Various electronic and electrical devices are equipped with many coil devices used such as inductors. As an example of such coil devices, the coil device shown in Patent Document 1 has been developed. In the coil device shown in Patent Document 1, a pair of spiral conductive metal pieces are laminated, and the inner ends of the metal pieces are welded and connected each other.

However, according to the conventional coil device, it is difficult to sufficiently secure the strength of the coil conductor connecting the inner ends of each metal piece because of thinness and flatness of each metal piece. If the strength of the coil conductor is insufficient, each metal piece is misaligned or deformed when the coil conductor is transported, or when the coil conductor is placed inside a press mold and the granules containing magnetic powder or the like are compression compacted to form a dust core.

To solve the problem, for example, the coil device shown in Patent Document 2 has been developed. However, even if the metal plate is processed to spirally cut out to form the coil conductor, the cut out process has a limitation on the thickness of the metal plate and the thickness of the coil conductor after forming will be limited. In recent years, it has been desired to further reduce the DC resistance of coil conductors used in coil devices.

[Patent Document 1] Japanese Unexamined Patent Application 2004-327622

[Patent Document 2] Japanese Unexamined Patent Application 2018-46117

SUMMARY OF THE INVENTION

The invention has been made in consideration of such situation. An object of the invention is to provide a coil device having a sufficient strength which is easy to transport and handle, and further having a low DC resistance.

In order to achieve the above object, the coil device according to the invention has a coil conductor having a multilayer part in which the multilayer part includes conductive plate pieces and surfaces of the conductive plate pieces are electrically connected in a laminating direction.

In the coil device of the invention, the coil conductor has the multilayer part in which the multilayer part has conductive plate pieces and surfaces of the conductive plate pieces are electrically connected in a laminating direction. Therefore, an aspect ratio (cross-sectional thickness/cross-sectional width) of the cross section of the coil conductor can be close to one, and in some cases, it can be one or more. Accordingly, mechanical strength of the coil conductor is improved, and it becomes easy to transport and handle. Further, when the coil conductor is arranged inside a press mold and the granules containing magnetic powder or the like are compression compacted to form a dust core, a multilayer part of the conductive plate pieces is less likely to be displaced or deformed. Therefore, the coil conductors including the multilayer part having conductive plate pieces are maintained mutually horizontal. Thus, it is possible to suppress variations in the coil device properties such as inductance properties. Furthermore, DC resistance of the coil conductor can also be reduced.

A main part of the coil conductor may be placed inside a sealing, and a thickness of a lead of the coil conductor, protruding from the sealing, is preferably equal to or less than a thickness of one of the conductive plate pieces constituting the multilayer part. The lead protruding from the sealing is, for example, often bent along an outer surface of the sealing. Accordingly, the thickness of the lead is preferably thin enough to be easily bent. The sealing may be made of such as a resin only, however, is preferably made of a magnetic powder containing resin and may function as a magnetic core.

A width of a tip end of the lead protruding from the sealing may be preferably wider than a width of a base end of the lead. The tip end of the lead is often a mounting part for an external circuit. Therefore, when the width of the tip end is widened, the mounting area improves, the mounting strength improves, and the reliability of electrical connection improves.

At least one of the conductive plate pieces constituting the coil conductor may have a common pattern, common to the other conductive plate pieces, and a non-common pattern, different from the other conductive plate pieces. The common pattern of each conductive plate piece can be electrically connected in the laminating direction to form the multilayer part. The non-common pattern of any of the conductive plate pieces can be, for example, the lead or a connection with a coil conductor placed in the other layer.

A surface of the coil conductor is preferably insulation coated. The surface of the coil conductor, constituted from the multilayer part of conductive plate pieces, is insulation coated. Therefore, it is possible to effectively prevent the coil conductors located in different layers from being short-circuited, even if the multilayer part is placed inside the sealing containing conductive magnetic grains. It is preferable that the connection between adjacent coil conductors and a mounting part of the lead serving as a connection with external circuits are not insulated and coated.

The coil conductor preferably has a first coil conductor having a first lead and a first multilayer part, a second coil conductor having a second lead and a second multilayer part, and a connection electrically connecting a first inner end of the first coil conductor and a second inner end of the second coil conductor. The conductive plate piece is formed by punch pressing from such as a metal plate. Therefore, the conductive plate piece having a winding pattern of one turn or less is easy to form, and a coil conductor constituted from the multilayer part of conductive plate pieces often has a winding pattern of one turn or less. Therefore, it becomes possible to increase the total number of winding turns by connecting the inner ends of the first coil conductor and the second coil conductor, and improve the inductance.

The connection may be a joint directly connecting the first inner end and the second inner end, or a connecting piece connected to the first inner end and the second inner end. The connection may be an intermediate coil conductor connected between the first inner end and the second inner end. By interposing the intermediate coil conductor between the first coil conductor and the second coil conductor, the total number of winding turns can be further increased, and the inductance thereof is further improved. There may be multiple intermediate coil conductors.

It is preferable that a first lead is formed with a first conductive plate piece, laminated and placed closest to the second multilayer part compared to the other first conductive plate pieces constituting the first multilayer part, a second lead is formed with a second conductive plate piece, laminated and placed closest to the first multilayer part compared to the other second conductive plate pieces constituting the second multilayer part, and the first lead and the second lead are pulled out from a position close to a center in the laminating direction of the sealing.

The first lead and the second lead are pulled out from a position close to the center in the laminating direction of the sealing. By doing so, it becomes possible to make a distance from the mounting part formed at the tip end of each lead to the coil pattern formed inside the sealing in first lead and the same in second lead substantially the same. As a result, a coplanarity (balance) of the coil device can be improved; and for instance, it becomes easy to suppress non-uniformity of the solder amount adhering to each lead when mounting the coil device.

An aspect ratio in a first cross section of the first multilayer part and an aspect ratio in a second cross section of the second multilayer part may be different. For instance, by making a thickness of the first multilayer part different from the same of the second multilayer part, the aspect ratio of the cross section changes, and the inductance of the coil device can be adjusted.

At least one of the first multilayer part or the second multilayer part may have a winding pattern of one turn or less. Namely, only the first multilayer part or only the second multilayer part may have a winding pattern of one turn or less, or the first multilayer part and the second multilayer part may have winding patterns of one turn or less, respectively. On the other hand, at least one of the first multilayer part and the second multilayer part may have a spiral winding pattern of one turn or more. Namely, only the first multilayer part or only the second multilayer part may have a spiral winding pattern of one turn or more, or the first multilayer part and the second multilayer part may have spiral winding patterns of one turn or more, respectively.

DESCRIPTION OF THE EMBODIMENTS

Figure 1:
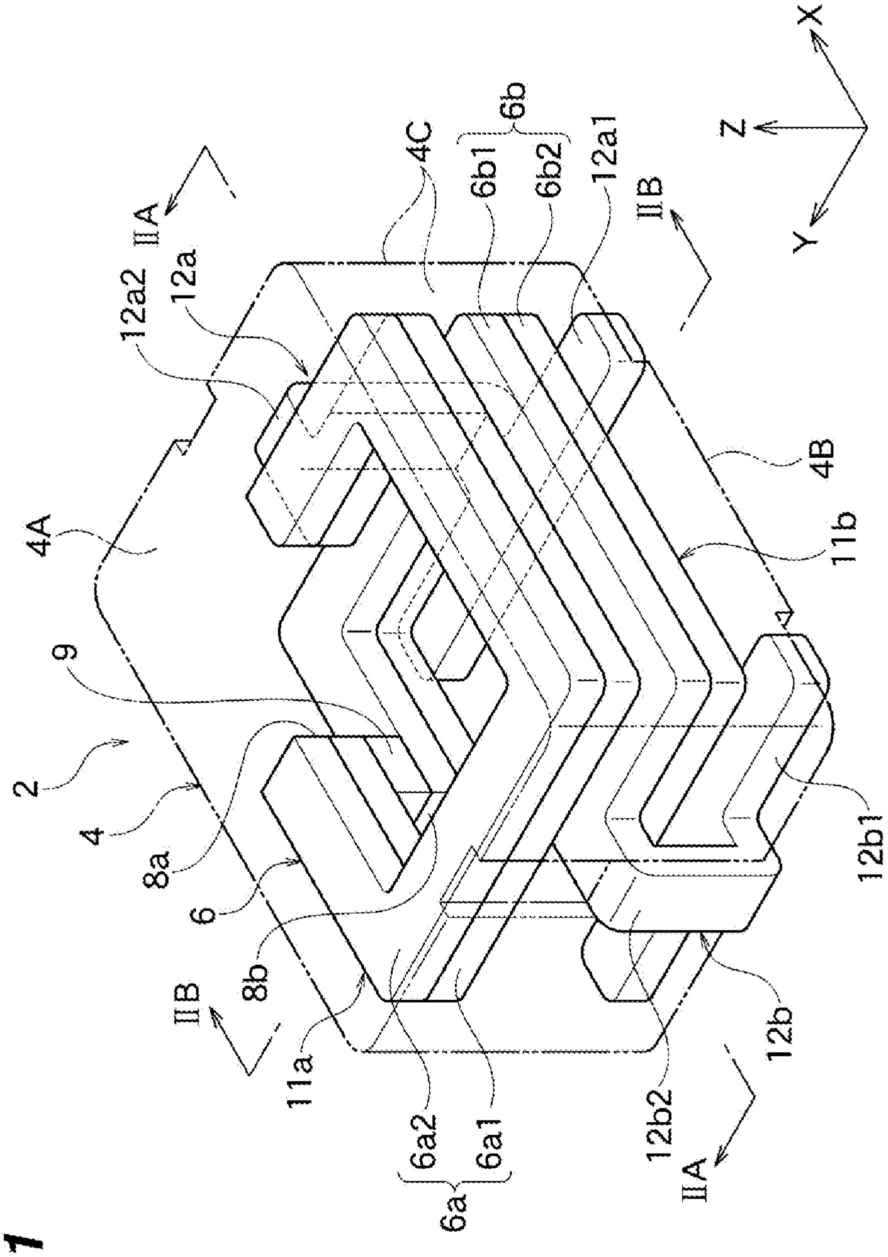
FIG. 1 is a schematic perspective view of the coil device according to an embodiment of the invention.

Hereinafter, the invention will be described based on the embodiments shown in the drawings.

The First Embodiment

As shown in FIG. 1, the inductor element 2 as the coil device according to an embodiment of the invention is used such as in a power supply system, and has a core (sealing) 4 as a compression compacted body and the coil conductor 6 that constitutes the coil inside of the core 4. The main part of the coil conductor 6 is covered with the core 4. The main part of the coil conductor 6 is a part excluding the leads 12*a* and 12*b* exposed from the core 4.

According to the embodiment, the core 4 has an upper surface 4A, four side surfaces 4C, and a lower surface 4B. The upper surface 4A of the core 4 is an outer surface of an antimounting side, substantially parallel to the lower surface 4B. The four side surfaces 4C are substantially perpendicular to the upper surface and the lower surface. However, the shape of the core 4 is not particularly limited, and is not limited to a hexahedron, and may be a cylindrical shape, an elliptical cylinder, a polygonal cylinder, etc.

The size of the inductor element 2 of the embodiment is not particularly limited, however, a width in the X-axis direction maybe 1.0 to 20 mm, a width in the Y-axis direction maybe 1.0 to 20 mm, and a height maybe 1.0 to 10 mm. The inductor element 2 can be used such as a transformer, a balun, a common mode filter (common mode choke), a circuit element such as a DC/DC converter, a choke coil in a power supply line, a decoupling element, an element for an impedance matching, a component element of the filter, and an antenna element, etc.

According to the embodiment, the core 4 is formed by compression compacting or injection compacting of granules containing magnetic powder and a binder. The magnetic powder is not particularly limited, however, Sendust (Fe—Si—Al; iron-silicon-aluminum), Fe—Si—Cr (iron-silicon-chromium), permalloy (Fe—Ni), carbonyl iron based, carbonyl Ni based, amorphous powder and nanocrystal powder, etc. are preferably used.

The grain size of the magnetic powder is preferably 0.5 to 50 μm. According to the embodiment, the magnetic powder is preferably metallic magnetic grains, and the outer periphery of the grain is preferably an insulating film. Examples of the insulating film include a metal oxide film, a resin film, and a chemical film of such as phosphorus, zinc, etc.

However, the magnetic powder may be a ferrite magnetic powder, such as Mn—Zn and Ni—Cu—Zn. The binder resin is not particularly limited, and examples thereof include epoxy resin, phenol resin, acrylic resin, polyester resin, polyimide, polyamide-imide, silicon resin, and a combination thereof.

As shown in FIG. 2, the coil conductor 6 has multiple coil conductors placed along the Z-axis direction (the laminating direction). In the following embodiments, the two first and second coil conductors 6*a* and 6*b* are connected in the Z-axis direction and constitute the coil conductor 6, however, the invention is not limited thereto.

The first coil conductor 6*a* has the first multilayer part 11*a* in which the surfaces of the first conductive plate pieces 6*a*1 and 6*a*2 are electrically connected in the laminating direction. Similarly, the second coil conductor 6*b* has a multilayer part 11*b* in which the surfaces of the second conductive plate pieces 6*b*1 and 6*b*2 are electrically connected in the laminating direction.

Figure 3A:
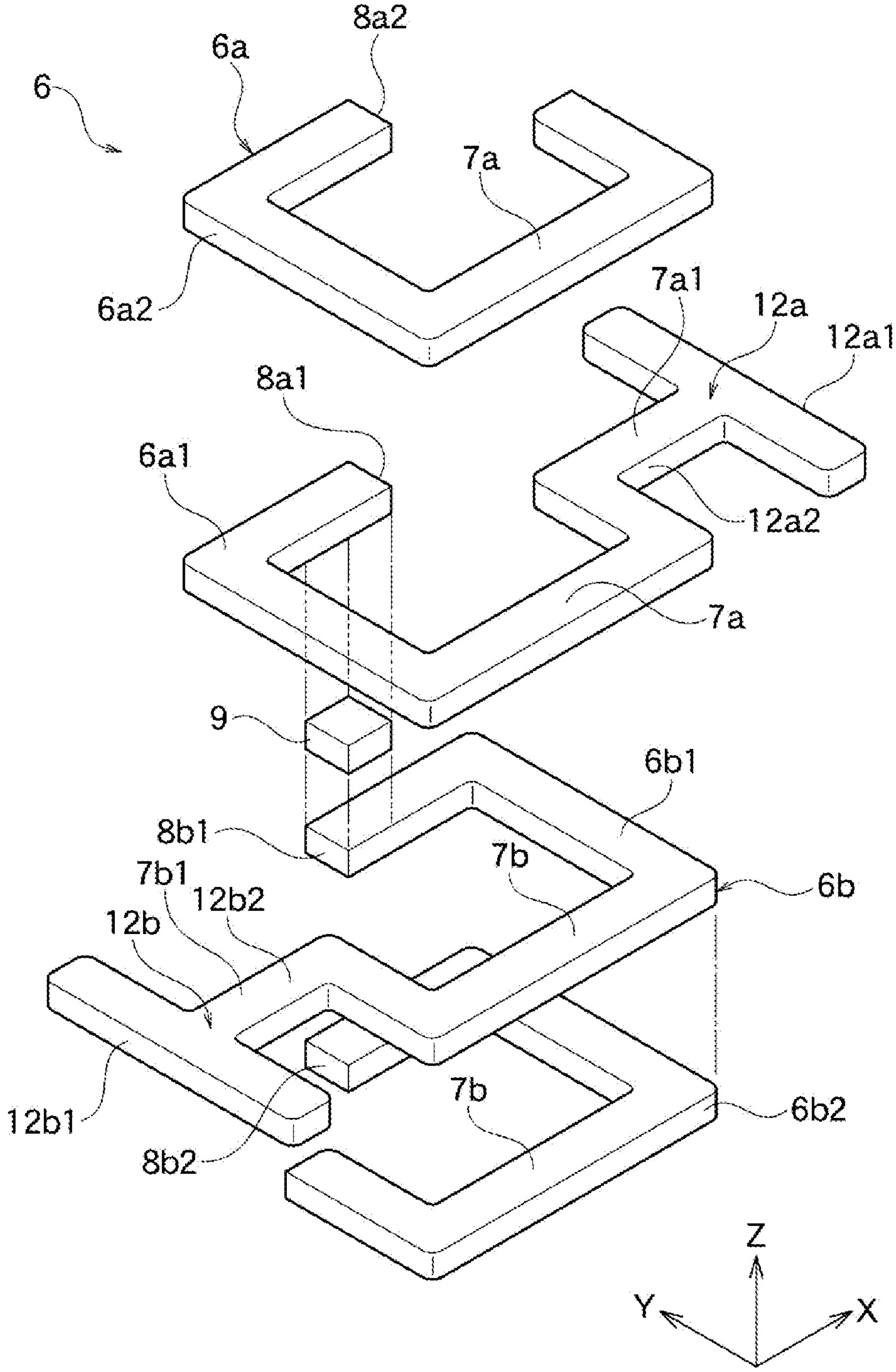
FIG. 3A is a perspective view showing a process of manufacturing the coil conductor of the coil device shown in FIG. 1.

As shown in FIG. 3A, a first conductive plate piece 6*a*1 constituting the first coil conductor 6*a* is a plane parallel to a two-dimensional plane including the X-axis and the Y-axis, and has a common pattern 7*a* and the non-common pattern 7*a*1. Further, another first conductive plate piece 6*a*2 constituting the first coil conductor 6*a* is a plane parallel to the two-dimensional plane including the X-axis and the Y-axis, and has only the common pattern 7*a*. However, the another first conductive plate piece 6*a*2 may also have the non-common pattern.

The common pattern 7*a* of the first conductive plate piece 6*a*1 and the common pattern 7*a* of the another first conductive plate piece 6*a*2 have a common pattern, and the plate surfaces thereof are electrically joined in the Z-axis direction to constitute the first multilayer part 11*a* shown in FIG. 1. According to the embodiment, the common pattern 7*a* has a square ring shape in which a part of the circumferential direction is cut out, and has a coil pattern of about ¾ turn, which is less than one turn.

The non-common pattern 7*a*1 of the first conductive plate piece 6*a*1 is a pattern that the another first conductive plate piece 6*a*2 does not have, and the non-common pattern 7*a*1 is not laminated with the another first conductive plate piece 6*a*2 and that they do not overlap. According to the embodiment, as shown in FIG. 1, the non-common pattern 7*a*1 is bent at the outer surface of the core 4 to become the first lead 12*a*.

According to the embodiment, the Z axis is parallel to the winding axis of the coil conductor 6 and parallel to the laminating direction in which the conductive plate pieces 6*a*1 and 6*a*2 are laminated and connected, the X axis is parallel to the direction in which the lead 12*a* or 12*b* is drawn from the core 4, and the Y-axis is perpendicular to the X-axis and the Z-axis.

Further, as shown in FIG. 3A, the second conductive plate pieces 6*b*1 constituting the second coil conductor 6*b* is a plane parallel to the two-dimensional plane including the X-axis and the Y-axis, and has the common pattern 7*b* and a non-common pattern 7*b*1. Further, the another second conductive plate piece 6*b*2 constituting the second coil conductor 6*b* is a plane parallel to the two-dimensional plane including the X-axis and the Y-axis, and has only the common pattern 7*b*. On the other hand, the another second conductive plate piece 6*b*2 may also have the non-common pattern.

The common pattern 7*b* of the second conductive plate piece 6*b*1 and the common pattern 7*b* of the another second conductive plate piece 6*b*2 have a common pattern, and the plate surfaces thereof are electrically joined in the Z-axis direction to constitute the second multilayer part 11*b* shown in FIG. 1. According to the embodiment, the common pattern 7*b* has a square ring shape in which a part of the circumferential direction is cut out, and has a coil pattern of about ¾ turn, which is less than one turn.

The non-common pattern 7*b*1 of the second conductive plate piece 6*b*1 is a pattern that the another second conductive plate piece 6*b*2 does not have, and the non-common pattern 7*b*1 is not laminated with the another second conductive plate piece 6*b*2 and that they do not overlap. According to the embodiment, the non-common pattern 7*b*1 is bent at the outer surface of the core 4 to become the second lead 12*b*. The first lead 12*a* and the second lead 12*b* are respectively drawn out from the core 4 on mutually opposite surface 4C along the X-axis.

According to the embodiment, among the first conductive plate pieces 6*a*1 and 6*a*2, the first conductive plate piece 6*a*1 in which the lead 12*a* is formed and the second conductive plate piece 6*b*1 in which the lead 12*b* is formed are placed so as to face each other at predetermined intervals along the Z axis. As a result, as shown in FIG. 1, the first lead 12*a* and the second lead 12*b* are pulled out from a position close to the center in the laminating direction (the Z-axis direction) of the core 4.

According to the embodiment, the first lead 12*a* protruding out from the core 4 along the X-axis is bent downward from the protruding base end 12*a*2 along the side surface 4C, and further, the tip end 12*a*1 of the first lead 12*a* is bent inward of the core 4 along the lower surface 4B. According to the embodiment, the lower surface of the core 4 is the mounting surface of the inductor device 2, and the tip end 12*a*1 of the first lead 12*a* is a part connected to such as a land part (not shown) of an external circuit board.

According to the embodiment, the width of the tip end 12*a*1 of the first lead 12*a* in the Y-axis direction is preferably equal to or less than the width of the lower surface 4B of the core 4 in the Y-axis direction, and moreover, is preferably wider than the width of the base end 12*a*2 of the lead 12*a* in the Y-axis direction. Further, the width of the tip end 12*a*1 of the first lead 12*a* in the Y-axis direction may suddenly widen only on the lower surface 4B of the core 4, or as shown in FIG. 3B, the width of the first lead 12*a* in the Y-axis direction may gradually increase from the base end 12*a*2 to the tip end 12*a*1.

Similarly, according to the embodiment, the second lead 12*b* protruding out from the core 4 along the X-axis is bent downward from the protruding base end 12*b*2 along the side surface 4C, and further, the tip end 12*b*1 of the second lead 12*b* is bent inward of the core 4 along the lower surface 4B. According to the embodiment, the lower surface of the core 4 is the mounting surface of the inductor device 2, and the tip end 12*b*1 of the second lead 12*b* is a part connected to such as a land part (not shown) of an external circuit board.

According to the embodiment, the width of the tip end 12*b*1 of the second lead 12*a* in the Y-axis direction is preferably equal to or less than the width of the lower surface 4B of the core 4 in the Y-axis direction, and moreover, is preferably wider than the width of the base end 12*b*2 of the lead 12*b* in the Y-axis direction. Further, the width of the tip end 12*b*1 of the second lead 12*b* in the Y-axis direction may suddenly widen only on the lower surface 4B of the core 4, or as shown in FIG. 3B, the width of the second lead 12*b* in the Y-axis direction may gradually increase from the base end 12*b*2 to the tip end 12*b*1.

Figure 3B:
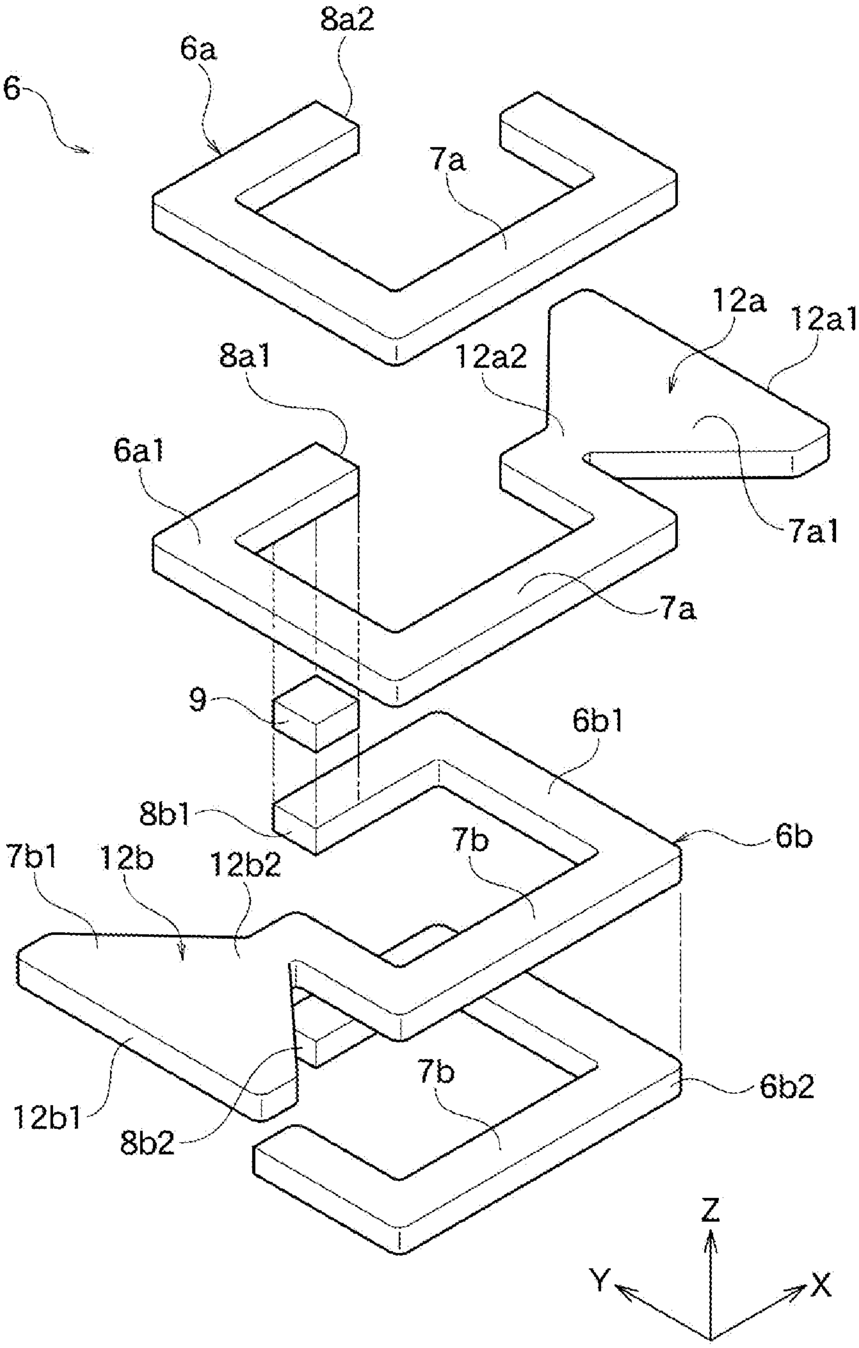
FIG. 3B is a perspective view showing a process of manufacturing the coil conductor of the coil device according to another embodiment of the invention.

As shown in FIGS. 3A and 3B, the connecting piece 9 is interposed between the first inner end 8*a*1 of the first conductive plate piece 6*a*1 having the first lead 12*a* and the second inner end 8*b*1 of the second conductive plate piece 6*b*1 having the second lead 12*b*. The first inner end 8*a*1 and the second inner end 8*b*1 are joined by such as resistance welding via the connecting piece 9, and they are electrically connected.

The first inner end 8*a*1 and the second inner end 8*b*1 may be directly joined by such as resistance welding without using the connecting piece 9. Further, according to the embodiment, the X-axis and Y-axis coordinate positions of the first inner end 8*a*1 of the first conductive plate piece 6*a*1 having the first lead 12*a* and the first inner end 8*a*1 of the first conductive plate piece 6*a*2 not having the first lead 12*a* are the same. On the other hand, the first inner end 8*a*1 of the first conductive plate piece 6*a*1 having the first lead 12*a* may be pulled out along the X axis more than the first inner end 8*a*2 of the first conductive plate piece 6*a*2 not having the first lead 12*a*. Similarly, the second inner end 8*b*1 of the second conductive plate piece 6*b*1 having the second lead 12*b* may be pulled out along the X axis more than the second inner end 8*b*2 of the second conductive plate piece 6*b*2 not having the second lead 12*b*. In this case, the first inner end 8*a*1 and the second inner end 8*b*1 can be easily joined by resistance welding or the like.

Figure 2A:
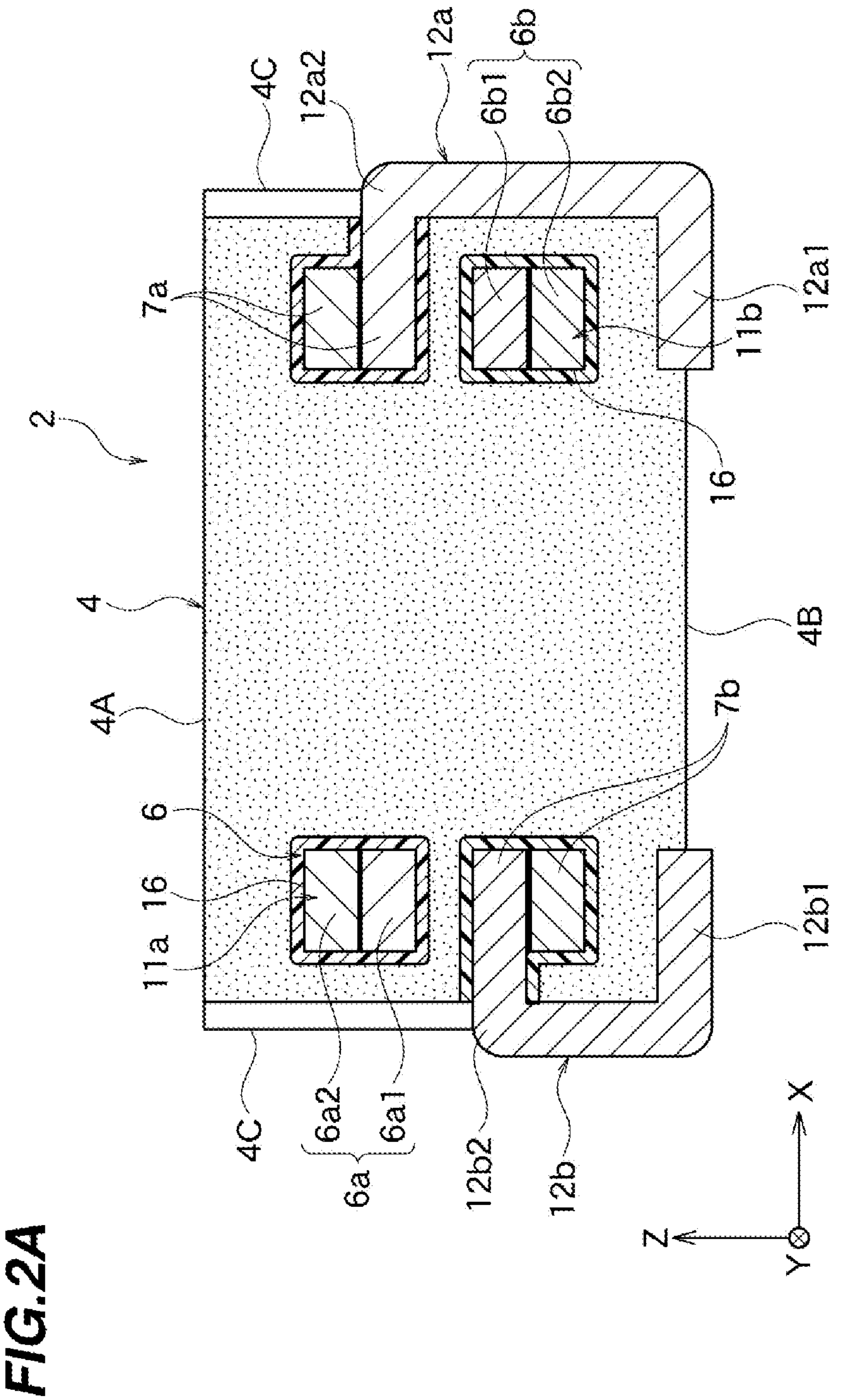
FIG. 2A is a schematic cross-sectional view along line IIA-IIA of the coil device shown in FIG. 1.
Figure 2B:
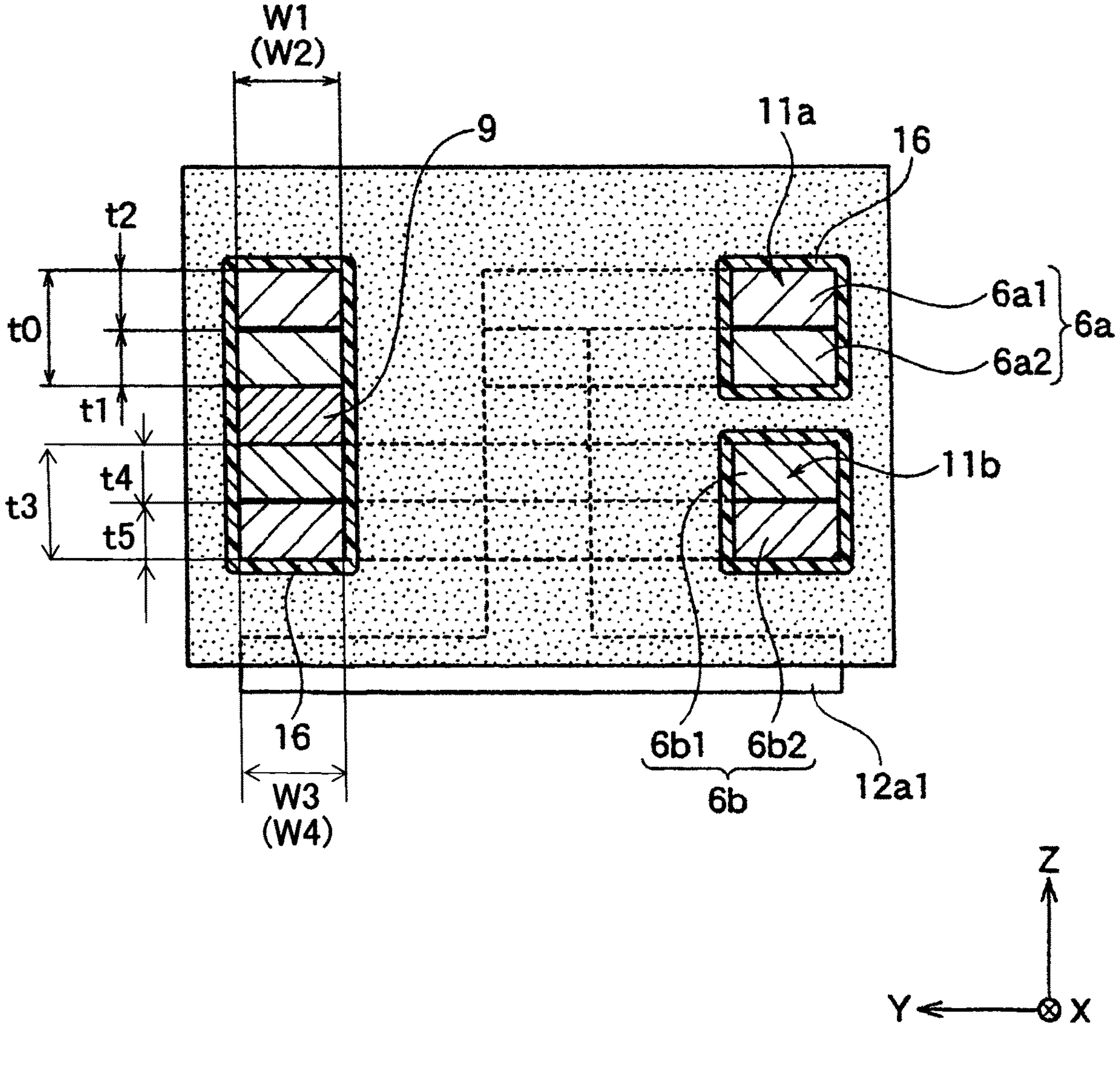
FIG. 2B is a schematic cross-sectional view along line IIB-IIB of the coil device shown in FIG. 1.

As shown in FIGS. 2A and 2B, according to the embodiment, the common pattern 7*a* of the first conductive plate piece 6*a*1 and the common pattern part 7*a* of the another first conductive plate piece 6*a*2 are joined at the interface in the Z direction, and they are electrically connected and constitute the first multilayer part 11*a*.

Similarly, according to the embodiment, the common pattern 7*b* of the second conductive plate piece 6*b*1 and the common pattern part 7*b* of the another second conductive plate piece 6*b*2 are joined at the interface in the Z direction, and they are electrically connected and constitute the second multilayer part 11*b*. The joint between the connecting piece 9 made of such as a metal plate piece and the first inner end 8*a*1 or the joint between the connecting piece 9 and the second inner end 8*b*1 may be the same joining means.

According to the embodiment, the conductive plate pieces 6*a*1, 6*a*2, 6*b*1, 6*b*2 and the connecting piece 9 are formed by, for example, punch pressing a metal plate piece. The plate width w1 of the conductive plate piece 6*a*1 and the plate width w2 of the conductive plate piece 6*a*2 are preferably substantially the same, but may be different. Further, the plate thickness t1 of the conductive plate piece 6*a*1 and the plate thickness t2 of the conductive plate piece 6*a*2 shown in FIG. 2B are preferably substantially the same, but may be different.

According to the embodiment, a total of the plate thickness t1 of the conductive plate piece 6*a*1 and the plate thickness t2 of the conductive plate piece 6*a*2 are the thickness t0 of the first multilayer part 11*a*. The other conductive plate pieces may be laminated and joined between the conductive plate piece 6*a*1 and the conductive plate piece 6*a*2. In this case, a total thickness of the plate pieces is the thickness t0 of the first multilayer part 11*a*. According to the embodiment, the cross-sectional aspect ratio (t1/w1 or t2/w2) of the thicknesses t1 or t2 of the plate pieces 6*a*1 or 6*a*2 with respect to the widths w1 or w2 of the plate pieces 6*a*1 or 6*a*2 is often 0.5 or less for some reasons such as difficulty of making each plate pieces. On the other hand, according to the multilayer part 11*a* of the embodiment having the conductive plate piece 6*a*1 and the conductive plate piece 6*a*2, the cross-sectional aspect ratio (t0/w1 or t0/w2) of the coil conductor 6*a* is preferably 0.8 or more, and more preferably 1.0 or more.

Similarly, as shown in FIG. 2B, the plate width w3 of the conductive plate piece 6*b*1 and the plate width w4 of the conductive plate piece 6*b*2 are preferably substantially the same, however, they may be different. Further, the plate thickness t4 of the conductive plate piece 6*b*1 and the plate thickness t5 of the conductive plate piece 6*b*2 shown in FIG. 2B are preferably substantially the same, however, they may be different.

According to the embodiment, a total of the plate thickness t4 of the conductive plate piece 6*b*1 and the plate thickness t5 of the conductive plate piece 6*b*2 are the thickness t3 of the second multilayer part 11*b*. The other conductive plate pieces may be laminated and joined between the conductive plate piece 6*b*1 and the conductive plate piece 6*b*2. In this case, a total thickness of the plate pieces is the thickness t3 of the second multilayer part 11*b*. According to the embodiment, the cross-sectional aspect ratio (t4/w3 or t5/w4) of the thicknesses t4 or t5 of the plate pieces 6*b*1 or 6*b*2 with respect to the widths w3 or w4 of the plate pieces 6*b*1 or 6*b*2 respectively is often 0.5 or less for some reasons such as difficulty of making each plate pieces. On the other hand, according to the multilayer part 11*b* of the embodiment having the conductive plate piece 6*b*1 and the conductive plate piece 6*b*2, the cross-sectional aspect ratio (t3/w3 or t3/w4) of the coil conductor 6*b* can be within the same range as the cross-sectional aspect ratio of the coil conductor 6*a*.

The plate width of the connecting piece 9 is preferably the same as the plate width w1 of the conductive plate piece 6*a*1 or 6*b*1, and the plate thickness of the connecting piece 9 may be equal to, greater than, or less than the plate thickness t1 of the conductive plate pieces 6*a*1 or 6*b*1. The plate thickness of the conductive plate piece 6*a*1 and the plate thickness of the conductive plate piece 6*b*1 are preferably the same, however, they may be different. According to the embodiment, the plate width w1 of the conductive plate pieces 6*a*1 or 6*b*1 is preferably 0.1 to 0.5 mm.

As shown in FIGS. 2A and 2B, according to the embodiment, at least the first coil conductor 6*a* and the second coil conductor 6*b* embedded inside the core 4, excluding the part joined by the connecting piece 9, is preferably insulation coated with the insulating film 16. The insulating film 16 is not particularly limited, however, it is preferably a thermosetting resin such as an epoxy resin or a urethane resin, a thermoplastic resin such as an acrylic resin or an olefin resin, an UV curable resin such as an acrylate radical polymer or an epoxy cationic polymer, a thermoplastic polyamide resin, etc.

Next, a method of manufacturing the inductor element 2 shown in FIG. 1 will be described. First, for example, a metal plate made of such as Cu, Al, Fe, Ag, Au, and an alloy thereof is prepared. For example, the metal plate may be plated with Sn or the like.

Next, a metal plate, including a metal foil, is punch processed into the shape of the conductive plate pieces 6*a*1, 6*a*2, 6*b*1, 6*b*2 or the connecting piece 9 as shown in FIG. 3A or FIG. 3B. Alternatively, the conductive plate pieces 6*a*1, 6*a*2, 6*b*1, 6*b*2 or the connecting piece 9 as shown in FIG. 3A or FIG. 3B are prepared by a method such as a laser processing, an etching processing, a wire cutting, an electric discharge processing, and a drill processing.

Next, the plate surfaces of the common patterns 7*a* and 7*a* of the first conductive plate pieces 6*a*1 and 6*a*2, respectively are joined. The plate surfaces of the common patterns 7*b* and 7*b* of the second conductive plate pieces 6*b*1 and 6*b*2, respectively are joined. The means for joining is not particularly limited, however, it is preferable that conductive plate pieces 6*a*1, 6*a*2 or 6*b*1, 6*b*2 made of a metal plate or the like are joined by metal diffusion bonding between the plate surfaces. For example, the means may be a resistance welding or a thermocompression bonding.

Before, after, or at the same time as the joining of the plate surfaces, the first inner end 8*a*1 of the first conductive plate piece 6*a*1 having the first lead 12*a* and the second inner end 8*b*1 of the second conductive plate piece 6*b*1 having the second lead 12*b* are joined via the connecting piece 9 or joined without the connecting piece, and electrically connected. The method for joining is not particularly limited. The same method as the joining method of the conductive plate pieces 6*a*1, 6*a*2 or 6*b*1, 6*b*2 may be used, or other methods may be used. Examples of the other joining methods include laser welding, resistance welding, arc welding, ultrasonic joining, solder joining, and joining with conductive paste, etc.

Next, the insulating film 16 shown in FIGS. 2A and 2B is formed. The insulating film 16 is formed after the joining steps of the conductive plate pieces **6*a*1 and 6*a*2 or 6*b*1 and 6*b*2 and the connecting step of the inner ends 8*a*1 and 8*b*1. It is preferable that the insulating film 16 on the outer surfaces of the leads 12*a* and 12*b*, protruding from the core 4 and connected to such as the external circuit board, is preferably removed in a later process. Alternatively, it is preferable to form the insulating film 16 by masking the outer surfaces of the leads 12*a* and 12*b*, protruding from the core 4 of the insulating film 16 and connected to such as the external circuit board. The method for forming the insulating film 16** is not particularly limited, and examples thereof include an electrodeposition method, a DIP method, etc.

Next, the main part of the coil conductor 6 is inserted into the press mold, the leads **12*a* and 12*b* and the like are exposed from the press mold, and the core 4 is formed in the press mold by compression compacting (a molding step). At the time of compression compacting, the inductor element 2 shown in FIG. 1** is obtained by filling the cavity of the press mold with a mixture containing the magnetic powder and the binder resin and heating and compressing the whole.

The heating temperature during the heat compression is preferably 50 to 300° C., and the compression pressure is preferably 1 to 400 Pa. As a method for the compression molding, a press mold may be used, or hydraulic pressure or water pressure may be used. At the time of compression molding, only the resin may be filled in the cavity instead of the above-mentioned mixture. Further, the molding step may be omitted, and the main part of the coil conductor 6 may be simply put in an exterior body (sealing) and fixed.

Next, such as a lead frame (not shown), which is integrally formed with each of the conductive plate pieces **6*a*1, 6*a*2, 6*b*1, 6*b*2, is cut with a cutting tool and removed. Further, as shown in FIG. 1, the leads 12*a* and 12*b* protruding from the core 4 are bent (a cut forming step) from the side surface 4C of the core 4 to the lower surface 4B along the outer surface of the core 4. As a result, the leads 12*a* and 12*b* are arranged on the lower surface 4B of the core 4. According to the embodiment, the lower surface 4B of the core 4 is the mounting surface, and the upper surface of the core 4** is the mounting surface.

According to the inductor device 2 of the embodiment, the coil conductor 6 include the multilayer part **11*a* or 11*b*, in which the surfaces of conductive plate pieces 6*a*1 and 6*a*2 or 6*b*1 and 6*b*2 are electrically connected to each other in the laminating direction (the Z axis direction), respectively. Therefore, as shown in FIG. 2B, the aspect ratio (cross-sectional thickness/cross-sectional width) of the cross section of the coil conductor 6*a* or 6*b* may be close to 1, and in some cases, it may be 1 or more. Therefore, the mechanical strength of the coil conductor 6 is improved, and the coil conductor 6 is easy to transport and handle. Further, when the main part of the coil conductor 6 is placed inside the press mold and the granules containing magnetic powder or the like are compression compacted to form a dust core, the multilayer part 11*a* or 11*b* of the conductive plate pieces are less likely to be misaligned or deformed. The coil conductors 6*a* and 6*b* including the multilayer part 11*a* and 11*b* of the conductive plate pieces, respectively are maintained mutually horizontal. Therefore, it is possible to suppress variations in the properties, such as an inductance property, of the inductor device 2. Furthermore, the DC resistance of the coil conductor 6** can also be reduced.

Further, according to the embodiment, the thickness of the lead **12*a* or 12*b* of the coil conductor 6 protruding from the core 4 is equal to or less than the thickness of one of the conductive plate pieces 6*a*1 and 6*a*2 or 6*b*1 and 6*b*2 constituting the multilayer part 11*a* or 11*b*. Since the lead 12*a* or 12*b* protruding from the core 4 is bent along the outer surface of the core 4, for example, the thickness of the lead 12*a* or 12*b*** may be thin enough to be easily bent.

Further, according to the embodiment, the width of the tip end **12*a*1 or 12*b*1 of the lead 12*a* or 12*b* protruding from the core 4 is larger than the width of the base end 12*a*2 or 12*b*2 of the lead. Since the tip end 12*a*1 or 12*b*1** of the lead is the mounting part for the external circuit, a wide tip end increases the mounting area, improves the mounting strength, and improves the reliability of the electrical connection.

Further, according to the embodiment, at least one of the conductive plate pieces **6*a*1, 6*a*2, 6*b*1, and 6*b*2 constituting the coil conductor 6 has a common pattern 7*a* or 7*b* common to other conductive plate pieces, or has a non-common pattern 7*a*1 or 7*b*1 different from the other conductive plate pieces. The common pattern 7*a* or 7*b* of each conductive plate piece can be the multilayer part 11*a* or 11*b*, electrically connected in the laminating direction. The non-common pattern 7*a*1 or 7*b*1 of any of the conductive plate pieces can be such as the lead 12*a* or 12*b***, or the connection with the coil conductor located in another layer.

Further, as shown in FIGS. 2A and 2B, according to the embodiment, the surface of the main part of the coil conductor 6 is insulated and coated with the insulating film 16. At least the surface of the coil conductor 6 including the multilayer part **11*a* or 11*b* of the conductive plate pieces is insulated and coated, it is possible to effectively prevent the coil conductors 6*a* and 6*b* located in different layers from being short-circuited, even when the multilayer part 11*a* or 11*b* is embedded inside the core 4** containing the conductive magnetic grains.

According to the embodiment, the coil conductor 6 includes the first coil conductor **6*a* having the first lead 12*a* and the first multilayer part 11*a*, the second coil conductor 6*b* having the second lead 12*b* and the second multilayer part 11*b*, and the connection 9 electrically connecting the first inner end 8*a*1 of the first coil conductor 6*a* and the second inner end of 8*b*1 of the second coil conductor 6*b*. The conductive plate pieces 6*a*1, 6*a*2, 6*b*1, 6*b*2 are formed by punch pressing from such as a metal plate, and has a winding pattern of one turn or less. Thus, the coil conductor 6*a* or 6*b* constituted from the multilayer part often has a winding pattern of one turn or less. Therefore, it becomes possible to increase the total number of winding turns by connecting the inner ends 8*a*1 and 8*b*1 of the first coil conductor 6*a* and the second coil conductor 6*b***, respectively and improve the inductance thereof.

Further, according to the embodiment, the first lead **12*a* is formed with the first conductive plate piece 6*a*1, laminated and placed closest to the second multilayer part 11*b* compared to the other first conductive plate pieces 6*a*1 and 6*b*1 constituting the first multilayer part 11*a*. The second lead 12*b* is formed with the second conductive plate piece 6*b*1, laminated and placed closest to the first multilayer part 11*a* compared to the other second conductive plate pieces 6*a*1 and 6*b*1 constituting the second multilayer part 11*b*. Thus, the first lead 12*a* and the second lead 12*b* are pulled out from a position close to the center of the side surface 4C of core 4** in the Z-axis direction.

the first lead **12*a* and the second lead 12*b* are pulled out from a position close to the center in the laminating direction of the core 4. The respective distance from the mounting parts formed on the tip ends 12*a*1, 12*b*1 of the leads 12*a*, 12*b* to the coil pattern formed inside the core 4 in the first lead 12*a* and the second lead 12*b* can be made closer to substantially the same. As a result, the coplanarity (balance) of the inductor device 2 can be improved, and for example, it becomes easy to suppress non-uniformity in the amount of solder adhering to the leads 12***a* and 12*b* when mounting the inductor device 2.

Figure 6:
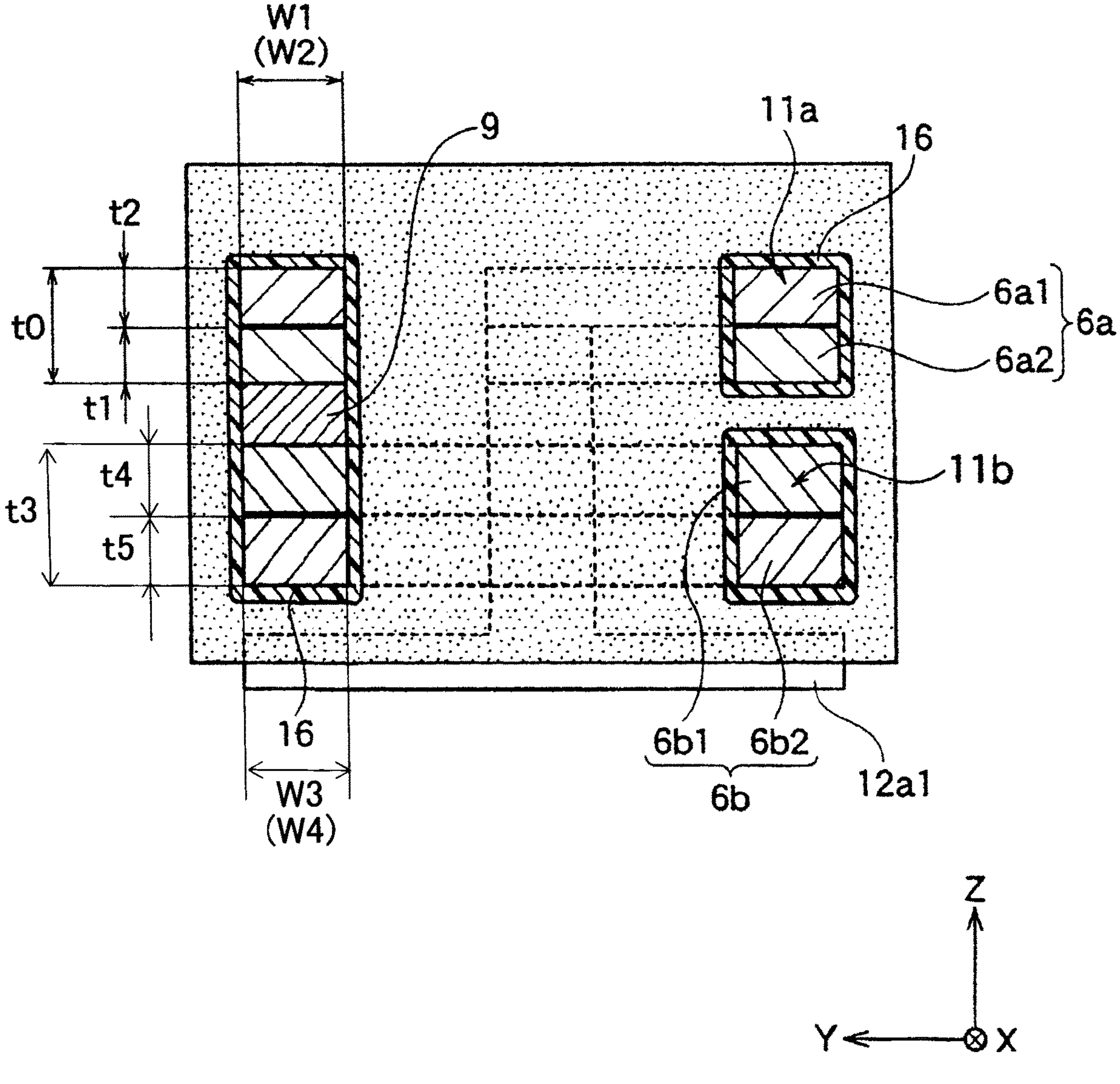
FIG. 6 is a schematic cross-sectional view of a coil device according to an embodiment.

Further, according to the embodiment shown in, for example, FIG. 6, the first cross-sectional aspect ratio (t0/w1 or t0/w2) of the first multilayer part 11*a* and the second cross-sectional aspect ratio (t3/w3 or t3/w4) of the second multilayer part 11*b* may be different. For instance, by making the thickness t0 of the first multilayer part 11*a* different from the thickness t3 of the second multilayer part 11*b*, the cross-sectional aspect ratio changes, and the inductance of the inductor device 2 can be adjusted.

According to the embodiment, the lead 12*a* is integrally formed with the first conductive plate piece 6*a*1, and the lead 12*b* is integrally formed with the second conductive plate piece 6*b*1. The leads 12*a* and 12*b* are parts exposed outside of the core (the sealing) 4. Since these parts are integrally formed with one of the conductive plate pieces, it is not necessary to separately connect the terminal pieces.

In the above-described embodiment, the method for processing the metal plate constituting the coil conductors 6*a* and 6*b* shown in FIG. 3A or FIG. 3B is not limited to punching, and may be an etching, a wire cutting, laser machining, electric discharge machining, and drill machining, etc.

The Second Embodiment

Figure 4A:
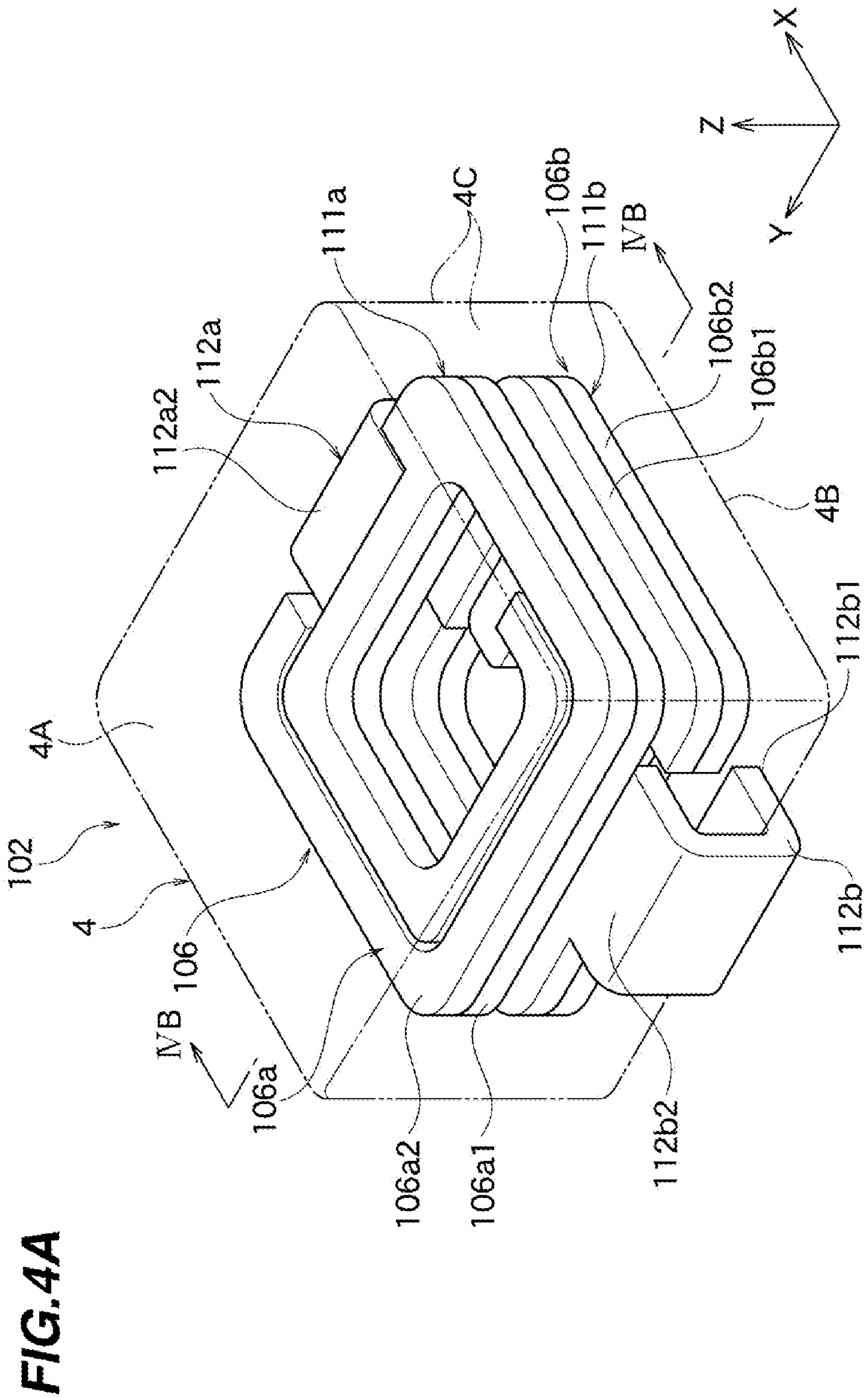
FIG. 4A is a schematic perspective view of the coil device according to another embodiment of the invention.
Figure 4B:
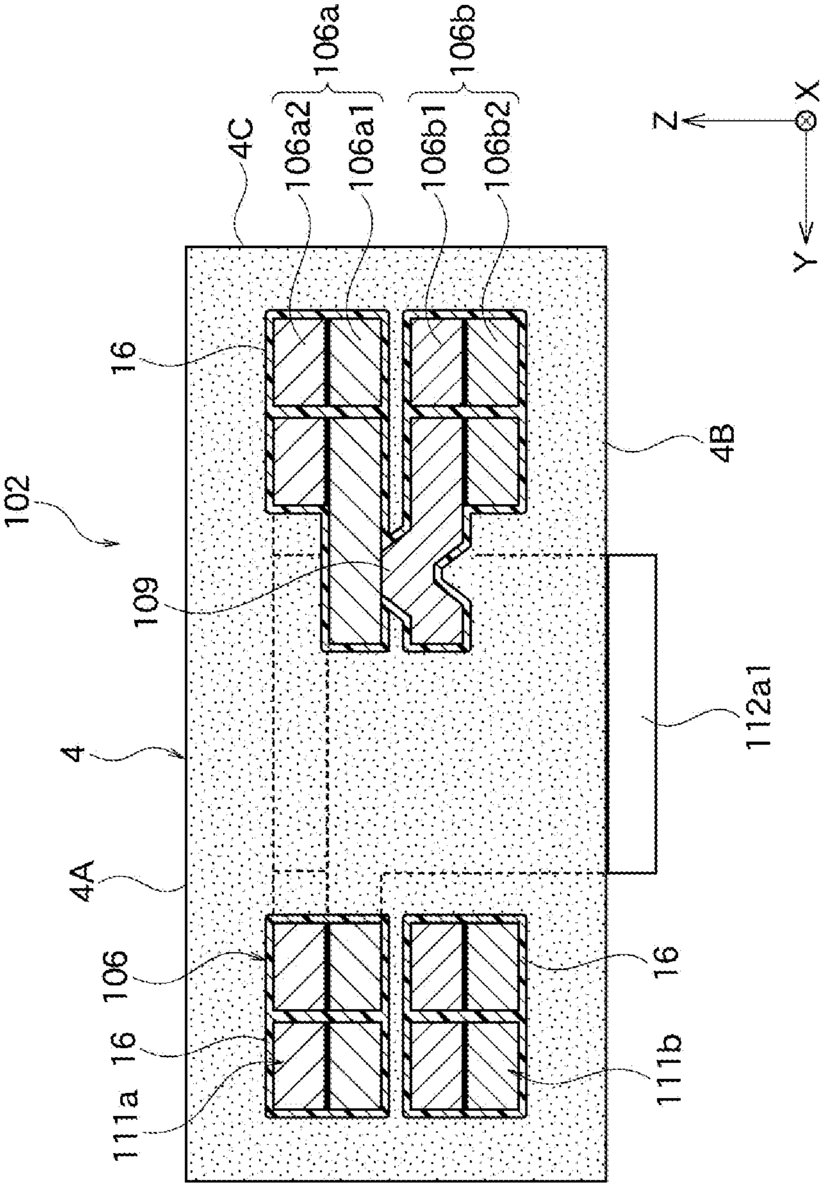
FIG. 4B is a schematic cross-sectional view along line IVB-IVB of the coil device shown in FIG. 4A.
Figure 5:
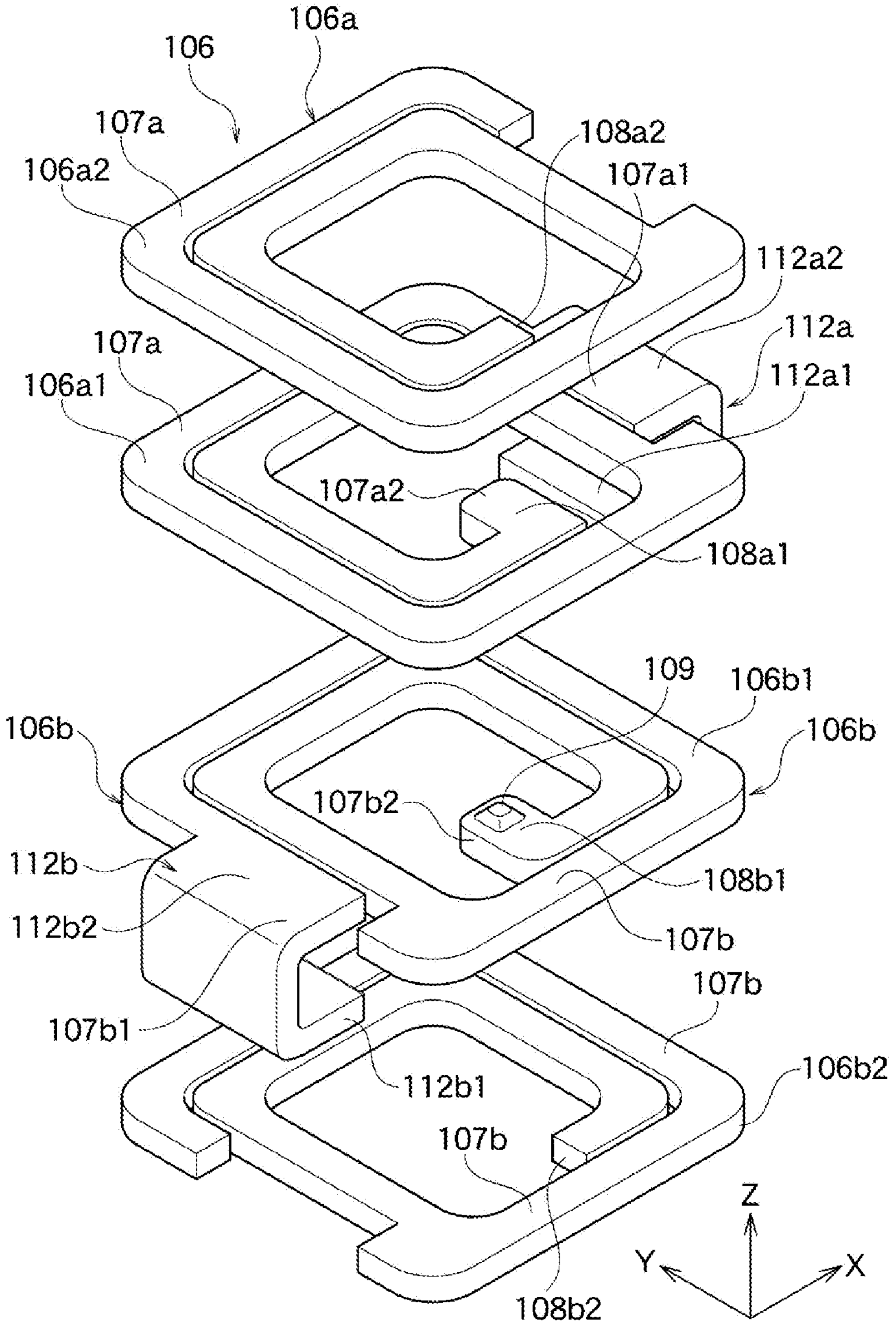
FIG. 5 is an exploded perspective view of the coil conductor of the coil device shown in FIG. 4A.

As shown in FIGS. 4A, 4B and 5, the inductor element 102 according to the embodiment is similar to the inductor element 2 according to the first embodiment, except that the configuration of the coil conductor 106 is different.

Hereinafter, the parts different from the first embodiment will be described in detail, and the descriptions of the common parts will be omitted. A common reference number (for example, the same one-digit or two-digit reference number) is attached to the respective common parts shown in FIGS., and the descriptions thereof will be partially omitted.

As shown in FIG. 4A, the coil conductor 106 of the embodiment has two coil conductors, the first and the second coil conductors 106*a* and 106*b*, arranged in the Z-axis direction (the laminating direction). The first coil conductor 106*a* has the first multilayer part 111*a*, in which the surfaces of the first conductive plate pieces 106*a*1 and 106*a*2 are electrically connected to each other in the laminating direction. Similarly, the second coil conductor 106*b* has the second multilayer part 111*b*, in which the surfaces of the second conductive plate pieces 106*b*1 and 106*b*2 are electrically connected to each other in the laminating direction.

As shown in FIG. 5, the first conductive plate piece 106*a*1 constituting the first coil conductor 106*a* is a plane parallel to a two-dimensional plane including the X-axis and the Y-axis, and has common patterns 107*a* and non-common patterns 107*a*1 and 107*a*2. Further, the another first conductive plate piece 106*a*2 constituting the first coil conductor 106*a* is a plane parallel to a two-dimensional plane including the X-axis and the Y-axis, and has only the common pattern 107*a*.

The common pattern 107*a* of the first conductive plate piece 106*a*1 and the common pattern 107*a* of the other first conductive plate piece 106*a*2 have a common pattern, and the plate surfaces thereof are electrically joined in the Z-axis direction to form the first multilayer part 111*a* shown in FIG. 4A. According to the embodiment, the common pattern 107*a* has a spiral shape of a square ring, and has a coil pattern of about (1+¾) turns, which is less than 2 turns.

The non-common pattern 107*a*1 located at the outer end of the first conductive plate piece 106*a*1 is a pattern that the another first conductive plate piece 106*a*2 does not have, and does not laminated with the another first conductive plate piece 106*a*2 and that they do not overlap. According to the embodiment, the non-common pattern 107*a*1 is bent at the outer surface of the core 4 to become the first lead 112*a*. Further, the non-common pattern 107*a*2 located at the first inner end 108*a*1 of the first conductive plate piece 106*a*1 is a pattern that the another first conductive plate piece 106*a*2 does not have, and is not laminated with the another first conductive plate piece 106*a*2. According to the embodiment, the non-common pattern 107*a*2 is the connection with the non-common pattern 107*b*2 of the second conductive plate piece 106*b*1 located in another layer.

As shown in FIG. 5, the second conductive plate piece 106*b*1 constituting the second coil conductor 106*b* is a plane parallel to a two-dimensional plane including the X-axis and the Y-axis, and has a common pattern 107*b* and non-common patterns 107*b*1 and 107*b*2. Further, the another second conductive plate piece 106*b*2 constituting the second coil conductor 106*b* is a plane parallel to a two-dimensional plane including the X-axis and the Y-axis, and has only the common pattern 107*b*.

The common pattern 107*b* of the second conductive plate piece 106*b*1 and the common pattern 107*b* of the other second conductive plate piece 106*b*2 have a common pattern, and the plate surfaces thereof are electrically joined in the Z-axis direction to form the second multilayer part 111*b* shown in FIG. 1. According to the embodiment, the common pattern 107*b*, similar to the common pattern 107*a*, has a spiral shape of a square ring, and has a coil pattern of about (1+¾) turns, which is less than 2 turns. The common pattern 107*b* may be a coil pattern having a number of winding turns different from that of the common pattern 107*a*.

The non-common pattern 107*b*1 of the second conductive plate piece 106*b*1 is a pattern that the another second conductive plate piece 106*b*2 does not have, and does not laminated with the another second conductive plate piece 106*b*2 and that they do not overlap. According to the embodiment, the non-common pattern 107*b*1 is bent at the outer surface of the core 4 to become the second lead 112*b*. The non-common pattern 107*b*2 located at the first inner end 108*b*1 of the second conductive plate piece 106*b*1 is a pattern that the another second conductive plate piece 106*b*2 does not have, and is not laminated with the another second conductive plate piece 106*b*2. According to the embodiment, the non-common pattern 107*b*2 has the connecting convex part 109, connecting with the non-common pattern 107*a*2 of the first conductive plate piece 106*a*1 located at another layer. The connecting convex 109 is formed so as to project in the Z-axis direction from the surface of the non-common pattern 107*b*2 located at the first inner end 108*b*1 of the second conductive plate piece 106*b*1 toward the first conductive plate piece 106*a*1.

According to the embodiment, the first lead 112*a* and the second lead 112*b* are respectively drawn out from the core 4 on opposite side surfaces 4C along the X-axis direction. The first conductive plate piece 106*a*1, in which the lead 112*a* is formed, of the first conductive plate pieces 106*a*1 and 106*a*2 and the second conductive plate piece 106*b*1, in which the lead 112*b* is formed, of the second conductive plate pieces 106*b*1 and 106*b*2, are placed so as to face each other at predetermined intervals along the Z axis. As a result, as shown in FIG. 4A, the first lead 12*a* and the second lead 12*b* are pulled out from the core 4 at a position close to the center in the laminating direction (the Z-axis direction).

According to the embodiment, the first lead 112*a* protruding out from the core 4 along the X-axis is bent downward from the protruding base end 112*a*2 along the side surface 4C, and further, the tip end 112*a*1 (See FIG. 5) of the first lead 112*a* is bent inward of the core 4 along the lower surface 4B. According to the embodiment, the lower surface of the core 4 is the mounting surface of the inductor device 102, and the tip end 112*a*1 of the first lead 112*a* is a part connected to such as a land part (not shown) of an external circuit board.

According to the embodiment, the width of the tip end 112*a*1 of the first lead 112*a* in the Y-axis direction is approximately ¼ to ¾ of the width of the lower surface 4B of the core 4 in the Y-axis direction, and moreover, equivalent to the width of the base end 112*a*2 of the first lead 112*a* in the Y-axis direction. Further, the width of the tip end 112*a*1 of the first lead 112*a* in the Y-axis direction may be constituted as in the above-described first embodiment. Similarly, according to the embodiment, the second lead 112*b* protruding from the core 4 to the outside along the X-axis has the same constitution as the first lead 112*a*.

As shown in FIGS. 4B and 5, the first inner end 108*a*1 of the first conductive plate piece 106*a*1 having the first lead 112*a* and the second inner end 108*b*1 of the second conductive plate piece 106*b*1 having the second lead 112*b* are joined and electrically connected by such as resistance welding using the connecting convex part 109 formed on any of the inner ends 108*a*1 and 108*b*1. The gap between the first conductive plate piece 106*a*1 with the first lead 112*a* and the second conductive plate piece 106*b*1 with the second lead 112*b* is determined by such as the protruding height of the connecting convex part 109.

According to the embodiment, the common pattern 107*a* of the first conductive plate piece 106*a*1 and the common pattern part 107*a* of the another first conductive plate piece 106*a*2 are joined at the interface in the Z direction, and they are electrically connected and constitute the first multilayer part 111*a*. Similarly, the common pattern 107*b* of the second conductive plate piece 106*b*1 and the common pattern part 107*b* of the another second conductive plate piece 106*b*2 are joined at the interface in the Z axis direction, and they are electrically connected and constitute the second multilayer part 111*b*.

According to the embodiment, each of the conductive plate pieces 106*a*1, 106*a*2, 106*b*1, 106*b*2 is formed by such as punch processing or laser processing a metal plate piece. The plate width of the conductive plate piece 106*a*1 and the plate width of the conductive plate piece 106*a*2, shown in FIG. 4B, are preferably substantially the same, however, they may be different. Further, the plate thickness of the conductive plate piece 106*a*1 and the plate thickness of the conductive plate piece 106*a*2, shown in FIG. 4B, are preferably substantially the same, however, they may be different. Similarly, the plate width of the conductive plate piece 106*b*1 and the plate width of the conductive plate piece 106*b*2 are preferably substantially the same, however, they may be different. The plate width of the conductive plate piece 106*b*1 and the plate width of the conductive plate piece 106*b*2 are preferably substantially the same, however, they may be different.

According to the embodiment, since all the coil conductors 106*a* and 106*b* have the spiral common patterns 107*a* and 107*b* of one turn or more, respectively. Thus, the number of turns of the coil conductor 106 can be increased. Further, according to the embodiment, at least one of the first multilayer part 111*a* and the second multilayer part 111*b* may have a winding pattern of one turn or less, or at least one of the first multilayer part 111*a* and the second multilayer part 111*b* may have a spiral winding pattern of one turn or more.

The invention is not limited to the above-described embodiments, and can be variously modified within the scope of the invention.

Figure 3C:
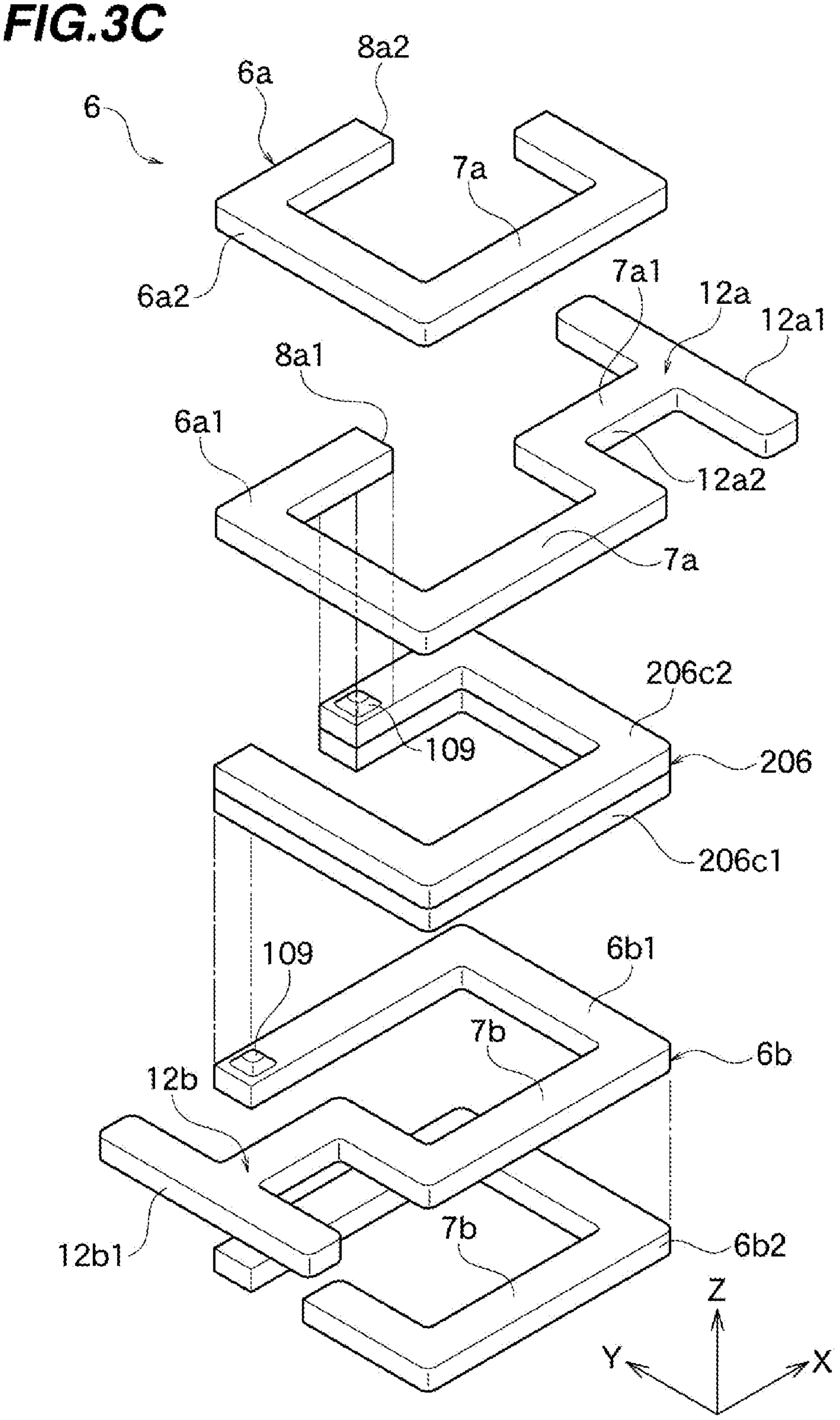
FIG. 3C is a perspective view showing a process of manufacturing the coil conductor of the coil device according to a furthermore embodiment of the invention.

For example, according to the above-described embodiments, the first coil conductor 6*a* or 106*a* and the second coil conductor 6*b* or 106*b* are placed in the Z-axis direction to constitute the coil conductor 6 or 106, however, another intermediate coil conductor 206 shown in FIG. 3C may be placed and connected between the first coil conductor 6*a* or 106*a* and the second coil conductor 6*b* or 106*b*. The intermediate coil conductor 206 can be constituted from the multilayer part of intermediate conductive plate pieces 206*c*1 and 206*c*2, which are a combination of such as the first coil conductor 6*a* or the second coil conductor 6*b* having the common pattern 7*a* or 7*b*, and hot having lead 12*a* or 12*b*.

By interposing the intermediate coil conductor 206 between the first coil conductor and the second coil conductor, the total number of winding turns can be further increased, and the inductance thereof is further improved. There may be multiple intermediate coil conductors. The intermediate conductive plate pieces 206*c*1 and 206*c*2 are made of the same material as the first conductive plate piece or the second conductive plate piece described above, and plate surfaces thereof are joined and laminated by the joining method, which is the same as the method described above.

Further, according to the above-described embodiment, the core 4 as the sealing is composed of a magnetic core containing magnetic grains, however, the core 4 as the sealing may be composed of non-magnetic materials, such as a resin not including magnetic grains.

According to the above-described embodiment, the core 4 may not be placed around the coil conductor 6 or 106, and the coil conductor 6 or 106 may be used as an air-core coil. Further, the core is not limited to the one formed by a powder compacting with the coil conductor 6 or 106. The core may be a toroidal type core, an EI type core, etc. formed separately from the coil conductor 6 or 106.

EXPLANATION OF REFERENCES

2, 102 inductor element (coil device)
4 core (sealing)
4*a* upper surface
4*b* lower surface
4*c* side surface
6, 106 coil conductor
6*a*, 106*a* first coil conductor
6*a*1, 6*a*2, 106*a*1, 106*a*2 first conductor plate piece
6*b*, 106*b* second coil conductor
6*b*1, 6*b*2, 106*b*1, 106*b*2 second conductor plate piece
7*a*, 7*b*, 107*a*, 107*b* common pattern
7*a*1, 7*b*1, 107*a*1, 107*b*1 non-common pattern
8*a*1, 8*b*1, 108*a*1, 108*b*1 first inner end
7*a*1, 7*b*1, 107*a*1, 107*b*1 second inner end
9 connecting piece (connection)
109 connecting convex part (connection)
10*a* first outer end
10*b* second outer end
11*a* first multilayer part
11*b* second multilayer part

12*a*, 12*b* lead
12*a*1, 12*b*1 tip end
12*a*2, 12*b*2 base end
16 insulation film
206 intermediate coil conductor
206*c*1, 206*c*2 intermediate conductive plate piece

What is claimed is:

1. A coil device comprising:

multiple coil conductors laminated in a laminating direction, each of the coil conductors including a multilayer part comprising conductive plate pieces, surfaces of the conductive plate pieces being electrically connected to each other in the laminating direction, and a magnetic core interposed between the coil conductors in the laminating direction, wherein the coil conductors comprises:

a first coil conductor having a first lead and a first multilayer part, a second coil conductor having a second lead and a second multilayer part, and a connection electrically connecting a first inner end of the first coil conductor and a second inner end of the second coil conductor, wherein the first coil conductor includes:

a primary first conductive plate piece including the first lead, and a secondary first conductive plate piece not having any lead, wherein the primary first conductive piece and the secondary first conductive plate piece are laminated together such that the primary first conductive plate piece including the first lead is arranged on a side of the secondary first conductive plate piece, the side being closest to the second multilayer part along the laminating direction, wherein the second coil conductor includes:

a primary second conductive plate piece including the second lead, and a secondary second conductive plate piece not having any lead, wherein the primary second conductive plate piece and the secondary second conductive plate piece are laminated together such that the primary second conductive plate piece including the second lead is arranged on a side of the secondary second conductive plate piece, the side being closest to the first multilayer part along the laminating direction, and wherein the first lead and the second lead protrude out from a sealing including the magnetic core at a position close to a center in the laminating direction.

2. The coil device according to claim 1, wherein a main part of the coil conductors is arranged inside a sealing including the magnetic core, and a thickness of a lead of the coil conductors, protruding from the sealing, is equal to or less than a thickness of one of the conductive plate pieces constituting the multilayer part.

3. The coil device according to claim 2, wherein a width of a tip end of the lead protruding from the sealing is wider than a width of a base end of the lead.

4. The coil device according to claim 1, wherein at least one of the conductive plate pieces comprises a common pattern, common to the other conductive plate pieces, and a non-common pattern, different from the other conductive plate pieces.

5. The coil device according to claim 1, wherein a surface of the coil conductors is insulation coated.

6. The coil device according to claim 1, wherein the connection is a joint directly connecting the first inner end and the second inner end, or a connecting piece connected to the first inner end and the second inner end.

7. The coil device according to claim 1, wherein the connection is an intermediate coil conductor connected between the first inner end and the second inner end.

8. The coil device according to claim 1, wherein an aspect ratio in a first cross section of the first multilayer part and an aspect ratio in a second cross section of the second multilayer part are different.

9. The coil device according to claim 1, wherein at least one of the first multilayer part and the second multilayer part has a winding pattern of one turn or less.

10. The coil device according to claim 1, wherein at least one of the first multilayer part and the second multilayer part has a spiral winding pattern of one turn or more.

11. The coil device according to claim 1, further comprising an insulating film for coating an entirety of surfaces of the first coil conductor, the second coil conductor, and the connection.

* * * * *